United States Patent [19]

Vacha et al.

[11] Patent Number: 4,938,562

[45] Date of Patent: Jul. 3, 1990

[54] OXIDE COATINGS FOR FLUORIDE GLASS

[75] Inventors: Lubos J. B. Vacha, Southbridge, Mass.; Cornelius T. Moynihan, Watervliet, N.Y.; Peter C. Schultz, Sturbridge, Mass.

[73] Assignee: SpecTran Corporation, Sturbridge, Mass.

[21] Appl. No.: 379,847

[22] Filed: Jul. 14, 1989

[51] Int. Cl.$^5$ .............................................. G02B 6/00
[52] U.S. Cl. .................................. 350/96.34; 65/3.11
[58] Field of Search ............... 350/96.30, 96.31, 96.32, 350/96.33, 96.34; 65/3.11

[56] References Cited

U.S. PATENT DOCUMENTS

| | | | |
|---|---|---|---|
| 4,141,741 | 2/1979 | Lucas et al. | 106/47 Q |
| 4,265,667 | 5/1981 | Ikeda et al. | 106/47 Q |
| 4,328,318 | 5/1982 | Miranday et al. | 501/40 |
| 4,343,638 | 8/1982 | Mitachi et al. | 65/2 |
| 4,346,176 | 8/1982 | Kanamori et al. | 501/37 |
| 4,358,543 | 11/1982 | Nozawa | 501/40 |
| 4,380,588 | 4/1983 | Mitachi et al. | 501/37 |
| 4,418,985 | 12/1983 | Kasori et al. | 350/96.34 |
| 4,439,008 | 3/1984 | Joorman et al. | 350/96.31 |
| 4,441,788 | 4/1984 | Guerder et al. | 350/96.34 |
| 4,445,755 | 5/1984 | Ohsawa et al. | 350/96.30 |
| 4,468,413 | 8/1984 | Bachmann | 427/39 |
| 4,519,826 | 5/1985 | Tran | 63/3.11 |
| 4,537,864 | 8/1985 | Tick | 501/30 |
| 4,539,032 | 9/1985 | Tran et al. | 65/32 |
| 4,552,431 | 11/1985 | Allemand et al. | 350/96.34 |
| 4,597,786 | 7/1986 | Nakai et al. | 65/2 |
| 4,627,865 | 12/1986 | Roba | 65/3.12 |
| 4,660,927 | 4/1987 | Kondow et al. | 350/96.34 |
| 4,674,835 | 6/1987 | Mimura et al. | 350/96.34 |
| 4,681,400 | 7/1987 | Ueba et al. | 350/96.34 |
| 4,709,987 | 12/1987 | Blackburn et al. | 350/96.34 |
| 4,750,806 | 6/1988 | Biswas | 350/96.30 |
| 4,768,859 | 9/1988 | Kasori et al. | 350/96.34 |
| 4,883,339 | 11/1989 | Vacha et al. | 350/96.34 |

OTHER PUBLICATIONS

Bunker et al., "Phosphate Glass Dissolution in Aqueous Solutions", J. Non-Cryst. Solids 64 (1984) pp. 291–316.

Wilder et al., "Property Variation in Alkali Alkaline-Earth Metaphosphate Glasses", J. Am. Cer. Soc. 67, No. 6 (1984), pp. 438–444.

Ray et al., "Oxide Glasses of Very Low Softening Point", GlassTech. 17 No. 2, Apr. 1976, pp. 66–71.

*Primary Examiner*—William L. Sikes
*Assistant Examiner*—Akm E. Ullah
*Attorney, Agent, or Firm*—Pennie & Edmonds

[57] ABSTRACT

Non-oxide or heavy metal fluoride glass optical fiber with or without a cladding and coated with an outer layer of an oxide glass having a glass transition temperature of less than 400° C. and a thermal expansion coefficient of less than about $19 \times 10^{-6}.C^{-1}$. Also, a method of making and providing such coatings on non-oxide or fluoride glass, and fiber optic products prepared by such methods.

15 Claims, No Drawings

OXIDE COATINGS FOR FLUORIDE GLASS

This is a division, of application Ser. No. 07/074,646 filed Jul. 17, 1987 now U.S. Pat. No. 4,883,339.

TECHNICAL FIELD

This invention relates to new coating compositions for providing various clear and opaque protective coatings for non-oxide (e.g., fluoride) glass optical fibers for improving the performance thereof.

BACKGROUND ART

Fluoride fiber has rapidly developed into a very useful medium for mid-IR transmission, with great potential for long distance IR communications. Fluoride fibers are predicted to have intrinsic losses less than those of silica fibers, which might increase significantly the repeator spacing in long fiberoptic links, especially in undersea cables. Unfortunately, the chemical durability of fluoride glasses is low and, therefore, the mechanical failure of fluoride fibers over extended periods of time will be more likely than with silica fibers. Liquid and gaseous water react readily with the fiber surface, leading to the formation of surface flaws and stress corrosion.

Two solutions to the corrosion/strength problem have been proposed. The first one is to protect the fiber surface by an impervious hermetic coating, so that the water or moisture would be prevented from reaching the fiber surface. Various types of plastic, metal and ceramic hermetic coatings have been described in the prior art.

The second solution is to make the core glass of mixed fluorides and cladding of chalcogenide glass. Chalcogenide glasses have better chemical durability than fluoride glasses (A. Nakata, J. Lau and J. D. Mackenzie, Materials Science Forum, 6, 717 (1985). The principal disadvantage of chalcogenide glass is its high level of toxicity, which is very disturbing in the case of medical or surgical applications.

Another problem, common to both fluoride and chalcogenide glasses, is the necessity to protect them during the fiber draw by an inert atmosphere to avoid surface reaction with moisture or oxygen. In fluoride glasses reaction with moisture can cause surface defects and initiate crystallization (G. S. Sapsford, N.J. Pitt and J. D. Morris, paper presented at Soc. of Glass Technology Meeting, Peebles, Scotland, Jun. 12, 1986; H. Schneider, A. Schobeth and A. Staudt, paper presented at 4th Int. Symposium on Halide Glasses, Monterey, Calif., Jan. 28, 1987).

A common way of protecting fluoride fibers today is by applying a thin layer (5-30 microns) of a Teflon FEP coating. This layer enables the fiber to be handled but does not protect it for long periods of time against moisture, which can migrate through the porous coating.

The object of this invention is to protect the fluoride fiber by providing an additional overcladding of oxide glass or other hermetic coatings which are compatible with the fluoride glass.

SUMMARY OF THE INVENTION

The present invention relates to a coated non-oxide (e.g., fluoride) glass optical fiber comprised of a core of a non-oxide glass, such as a heavy metal fluoride, and a coating of a metal oxide glass which has a similar glass transition temperature (typically in the range 200°–400° C.) and thermal expansion coefficient (typically in the range of 15 to $19 \times 10^6$°coating is an alkali borophosphate or an alkali-Group II metal phosphate material, wherein the viscosity of the oxide coating material at the draw temperature is approximately the same as the viscosity of the non-oxide glass, and the oxide coating can have an index of refraction which is less than that of the non-oxide glass core. If desired, a cladding of a different glass can be added between the core and the oxide glass coating.

The invention also relates to a method for making a non-oxide glass optical fiber which is resistant to water or water vapor during preform handling, fiber drawing and fiber usage which comprises drawing the non-oxide glass fiber from a draw furnace, possibly without a protective atmosphere, from a preform which is comprised of a non-oxide glass core and a protective overclad of oxide glass having a glass transition temperature below about 400° C., a thermal expansion coefficient in the range of 15 to $19 \times 10^{-6}$·C.$^{-1}$ and a viscosity which is approximately the same as the viscosity of the non-oxide glass at the drawing temperature to obtain a coated optical fiber. Typically, the fiber is drawn in a range between 300° and 425° C.

The perform may be made by initially melting the oxide glass coating, casting the molten oxide glass into a rotating mold to form a tube of oxide glass, and placing a molten non-oxide glass composition into the tube of oxide glass to form the preform. Also, the preform can include a non-oxide glass cladding between the non-oxide glass core and oxide glass coating, which cladding is added to the preform after the metal oxide glass tube is formed. The metal oxide glass compositions described above are preferably used in this preform.

An additional embodiment of the invention relates to a method for imparting high strength properties as well as resistance to water or moisture to a non-oxide or heavy metal fluoride glass fiber while retaining the optical properties of the fiber, which method comprises coupling an outer layer of a protective metal oxide glass overclad of the compositions described above to the optical fiber.

The coated non-oxide fluoride glass optical fibers produced by the previously described methods represent another embodiment of the invention.

DESCRIPTION OF THE PREFERRED EMBODIMENTS

The present invention relates to a new construction for non-oxide glass optical fiber, and particularly for fluoride glass optical fiber: a conventional heavy metal fluoride glass core and clad are coupled with an outer layer of protective oxide glass. Such oxide coated fluoride fibers possess the following advantages:

(1) they retain the optical properties of the conventional heavy metal fluoride glass fiber, while the oxide coating imparts the strength and mechanical properties of the oxide glass to the fiber;

(2) the oxide coating precludes surface hydrolysis and crystallization of the fluoride glass core during the drawing operation;

(3) the need for a dry protective atmosphere over the fluoride fiber during the drawing operation is reduced or eliminated;

(4) preforms with oxide coatings can be made larger than preforms containing only fluoride glass because of the oxide's greater stability against crystallization and higher thermal conductivity. This allows greater lengths of fiber to be produced from the preform while lowering the cost of the materials; and (5) they retain the physical properties of oxide glass cladding, which makes conventional removal of polymer coatings easier compared to those on fluoride glass claddings.

The oxide glass for the coating is chosen from a variety of known glass compositions having similar viscosity and thermal expansion properties as the fluoride core and clad. This means that the glass transformation temperature ($T_g$) is below about 400° C. and preferably between about 200° and 300° C., preferably between 230° and 290° C. Also, the thermal expansion coefficient of the oxide glass should be similar to or lower than that of the fluoride glass, i.e., below about $19 \times 10^{-6}°C.^{-1}$ and preferably between $15 \times 10^{-6}°C.^{-1}$ and $19 \times 10^{-6}°C.^{-1}$. Also, the log of viscosity of the oxide glass coating should range from about $10^5$ to $10^6$ poise at the fluoride fiber drawing temperature for optimum compatibility of the cladding with the fluoride glass core.

This oxide glass layer protects from reaction with water the fluoride glass during the entire process of preform handling, fiber drawing, and fiber usage. This reduces and may eliminate, therefore, the need for a protective atmosphere during the fiber draw and simplifies the draw furnace arrangement. Another advantage of this coated fluoride glass composite is in the increased durability and strength during the fiber lifetime. Incorporation of other oxides, such as $Al_2O_3$, will increase the chemical durability of the oxide glass. Lowering the thermal expansion coefficient of the oxide clad relative to the fluoride core can increase the fiber strength by placing the cladding under compression.

Oxide glasses matching the above requirements can be chosen from the group of alkali borophosphates, for example, $K_2O-B_2O_3-P_2O_5$, $Na_2O-B_2O_3-P_2O_5$, $Li_2O-B_2O_3-P_2O_5$ (N. H. ray et al., Glass Technology, 17, 66 (1976)) or from group of alkali-Group II metal phosphate glasses (J. E. Shelby and J. A. Wilder, Journal of the American Ceramic Society, 67 438 (1984). In these glasses, the relative proportion of components preferably is as follows:

| | |
|---|---|
| alkali oxides | 20 to 50 mol % |
| Group II-A or II-B metal oxide or boron oxides | 10 to 30 mol % |
| phosphorus pentoxide | 30 to 60 mol % |

The most preferred alkali oxides are sodium, potassium and lithium. Although a single alkali oxide can be used for simplicity of formulation, mixtures of two or more of such alkali oxides can be used if desired. The preferred Group II metal oxide components include ZnO and BaO. Alternatively, boron oxide can be used instead of or with the alkaline earth oxide with similar results. As noted above, other oxides can be added for imparting particular properties or performance characteristics to the material.

| | |
|---|---|
| $Li_2O$ | 0–22 mol % |
| $Na_2O$ | 15–42 mol % |
| $K_2O$ | 0–22 mol % |
| ZnO | 15–20 mol % |
| $P_2O_5$ | 40–55% mol % |

Other ($CaO$, $Al_2O_3$, $ZnO_2$, $GeO_2$, $SiO_2$, $TiO_2$, etc.) 0–10 mol % provided that the sum of $Li_2O+Na_2O+ZnO+P_2O_5$ is greater than 90 mol %.

The most advantageous formulations for the glass oxide claddings are set forth in the Examples.

EXAMPLES

Reference is now made to the following examples for a more detailed explanation of the preferred embodiments of the invention.

EXAMPLE 1

Glass NZP ($Na_2O-ZnO-P_2O_5$) with 42.1 mol % $Na_2O$, 16.5 mol % ZnO and 41.4 mol % $P_2O_5$ has been prepared from $NH_4H_2PO_4$ (ammonium dihydrogen phosphate) mixed with ZnO and $Na_2CO_3$. After mixing, the batch was placed in a platinum crucible and heated at 300° C. to calcine and release the ammonia and water vapors. The calcined batch was then heated to a temperature of 900° C. and held there for three hours. After melting, the glass was cast into cullet on a cold brass mold. The cullet was then remelted in a glove box furnace and cast into a rotating preform mold at 260° C. to form an overcladding tube for the preform. The molten fluoride cladding composition was rotationally cast into this oxide glass tube, and subsequently the tube was filled with the molten fluoride core composition. After annealing, the preform investigated was inspected for crystals at the clad-overclad interface; no such crystals were found. The fluoride glass clad was a six component $ZrF_4-HfF_4-Ba_2F-LaF_3-AlF_3-NaF$ (ZHBLAN) composition, while the core was $ZrF_4-BaF_2-LaF_3-AlF_3-NaF$ (ZBLAN) composition.

The NZP oxide glass transition temperature, measured by DSC, was 264° C. This temperature is very close to that of conventional ZBLAN glass. Other ZBLAN fluoride glass compositions, as disclosed in U.S. Pat. No. 4,445,755, can also be used in this invention. The ZBLAN glass disclosed above has a glass transition temperature of 260° C. and a linear coefficient of expansion of $16.7 \times 10^{-6}°C.^{-1}$. The linear coefficient of expansion of the oxide overclad glass is similar to that of the ZHBLAN and ZBLAN glasses.

Fiber has been drawn from this preform to verify the compatibility of the thermal properties of the three glasses. The fiber draw was conducted at slightly higher drawing temperatures compared with those used for preforms containing only fluoride glass (400° C. instead of 360° C.).

A 200 micron diameter fiber approximately 500 m long was drawn from the preform. Tests on this fiber show that the median strength is approximately double that of a ZBLAN glass fiber without the oxide glass coating. The coated fiber was also found to be much less fragile during stripping, cleaving and other normal handling operations compared to similar uncoated fluoride fibers.

Also, on immersion in water, the oxide glass showed only slight attack after four hours at 20° C., while a similar fluoride glass was attacked after only 30 minutes.

EXAMPLE 2

Glass KNZP ($K_2O-Na_2O-ZnO-P_2O_5$) with 21 mol % $K_2O$, 21 mol % $Na_2O$, 16.5 mol % ZnO and 41.5 mol % $P_2O_5$ was prepared. The mixed alkali effect was found to lower the $T_g$ of this glass to 230° C., approximately 30° C. lower than that of the NZP glass described in Example 1.

Because of its lower $T_g$ and lower viscosity, KNZP glass was found more suitable for overcladding of a fluoride preform, since the fiber draw temperature could be further lowered. This further minimizes the risk of core glass crystallization at elevated temperature.

This oxide glass gave excellent results as a clad on the ZBLAN fluoride glass core.

EXAMPLE 3

An oxide glas LNZP—1 ($Li_2O$—$Na_2O$—$ZnO$—$P_2O_5$) with 21 mol % $Li_2O$, 21 mol % $Na_2O$, 16.5 mol % ZnO and 41.5 mol % $P_2O_5$ was prepared and used as a coating for a fluoride fiber. The $T_g$ of this oxide glass is 256° C., and the linear thermal expansion coefficient is $17.4 \times 10^{-6}$°C.$^{-1}$. The viscosity of this oxide glass is approximately the same as that of the ZBLAN glass at the drawing temperature, i.e., about $10^6$ poise at 302° C.

This oxide glass gave excellent results as a clad on a ZBLAN fluoride glass core or a ZBLAN core and ZHBLAN clad.

EXAMPLE 4

An oxide glass of composition KNZP described above was used to form a cladding tube having refractive index of 1.492. A core was made of a $ZrF_4$—$BaF_2$—$LaF_3$—$AlF_3$ (ZBLA) glass having a refractive index of 1.515. This glass pair gives a fiber having a nominal numerical aperture (NA) of about 0.26.

Preforms of this sort consisting of an oxide glass clad and a fluoride glass core can be used to fabricate optical fiber for short wavelength applications, i.e., at wavelengths of about 2 ≠microns or less.

Again, the clad is compatible with the fluoride core and provides acceptable performance.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A coated optical fiber comprising a core of a non-oxide glass and a coating of an oxide glass having a glass transition temperature below 400° C. and a thermal expansion coefficient of less than about $19 \times 10^{-6}$°C.$^{-1}$.

2. The coated optical fiber of claim 1 wherein the coating is an alkali borophosphate or a alkali-Group II metal phosphate.

3. The coated optical fiber of claim 1 wherein the viscosity of coating at the draw temperature is approximately the same as the viscosity of the non-oxide glass.

4. The coatd optical fiber of claim 1 further comprising a non-oxide cladding layer between the core and the metal oxide glass coating.

5. The coated optical fiber of claim 1 wherein the oxide glass is an alkali zinc phosphate or alkali borophosphate.

6. The coated optical fiber of claim 1 wherein the coating has an index of refraction which is less than that of the glass core.

7. The coated optical fiber of claim 1 wherein the oxide coating further comprises one or more additional oxides to increase the durability of the coating.

8. The coated optical fiber of claim 7 wherein the additional oxide is $Al_2O_3$, $GeO_2$, $ZrO_2$ $SiO_2$ or mixture thereof.

9. A coated optical fiber which is resistant to water or water vapor during preform handling, fiber drawing and fiber usage comprising a core of a non-oxide glass having the capability of acting as an optical transmission medium and a coating of an oxide glass having a glass transition temperature below 400° C. and a thermal expansion coefficient of less than between about $19 \times 10^{-6}$ C.$^{-1}$, made by a method which comprises drawing the fiber from a draw furnace without a protective atmosphere from a preform of a non-oxide glass core and an overclad of an oxide glass having a glass transition temperature below 400° C., a thermal expansion coefficient of less than about $19 \times 10^{-6}$ C.$^{-1}$, and a viscosity which is approximately the same as the viscosity of the glass core at the drawing temperature to obtain the coated optical fiber.

10. A coated optical fiber comprising a fluoride glass core, a fluoride cladding therefore, and a protective coating of an oxide glass having a glass transition temperature below about 400° C. and a thermal expansion coefficient of less than about $19 \times 10^{-6}$ C.$^{-1}$.

11. The coated optical fiber of claim 10 wherein the coating is an alkali borophosphate or a alkali-Group II metal phosphate.

12. The coated optical fiber of claim 10 wherein the viscosity of coating at the draw temperature is approximately the same as the viscosity of the fluoride glass.

13. The coated optical fiber of claim 10 wherein the metal oxide glass is an alkali zinc phosphate or alkali borophosphate.

14. The coated optical fiber of claim 10 wherein the oxide coating further comprises one or more additional oxides to increase the durability of the coating.

15. The coated opticl fiber of claim 14 wherein the additional oxide is $Al_2O_3$, CaO, $TiO_2$, $GeO_2$, $ZrO_2$, $SiO_2$ or mixtures thereof.

* * * * *